Sept. 19, 1933.  G. W. ANDREWS, JR  1,927,675
WORK HOLDING DEVICE
Filed Sept. 30, 1929
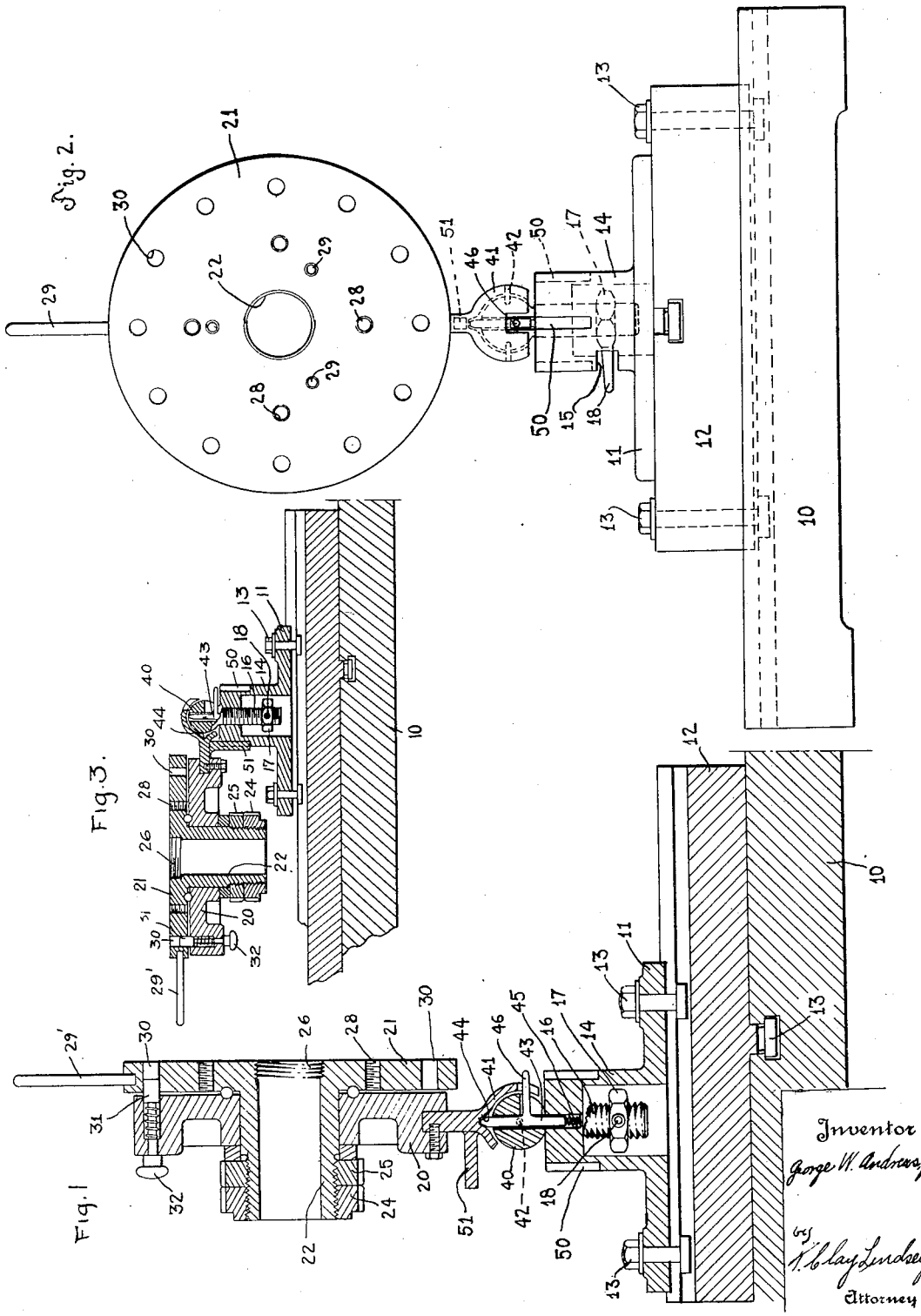

Patented Sept. 19, 1933

1,927,675

UNITED STATES PATENT OFFICE 1,927,675

WORK HOLDING DEVICE

George W. Andrews, Jr., Vernon, Conn.

Application September 30, 1929
Serial No. 396,175

4 Claims. (Cl. 51—216)

This invention relates to work holding devices of the type described and claimed in my co-pending application Serial No. 219,932 filed September 16th, 1927, the work holding device being particularly adapted for holding valve bodies, the chambers, cylinders or valve seats of which are to be reamed, lapped or polished. The aim of the present invention is to provide certain improvements and advancements in the structure shown in my said application.

More particularly, an aim of the invention is to provide an improved work holding device having the advantages disclosed in my said application and wherein the work holder per se may be positioned either vertically or horizontally depending upon the character of the work to be operated upon. The work holding element is adapted to be brought to a horizontal plane so that the chamber or cylinder in the work to be operated upon is vertically disposed with the result that when the tool is placed in this chamber or cylinder, there is no tendency for the tool, due to its weight, to bear against one portion of the chamber more than against other portions.

A further object of the invention is to provide a simple and effective arrangement by means of which the above and other objects may be easily, quickly and economically obtained.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein I have shown, for illustrative purposes, one of the many embodiments which the present invention may take:

Figure 1 is a central vertical sectional view through the device, the work holder being vertically disposed;

Fig. 2 is a front view of the work holding device; and

Fig. 3 is a view similar to Fig. 1 but showing the work holder adjusted to horizontal position.

Referring to the drawing in detail, 10 designates a base or frame of any suitable construction and on which base or frame the tool holder may be mounted, as disclosed in my said application, the tool holder not being shown in the present instance. Mounted upon the base for longitudinal movement is a slide 11 carried by a cross slide 12 mounted for transverse movement. The slides may be clamped in place by the usual bolts 13. Arising from the slide 11 is a vertical cylindrical boss or hub 14 which is internally threaded and which has a slot 15 adjacent its lower end. Threaded in the hub for adjustment about a vertical axis is an upstanding stud or stem 16. For the purpose of clamping this stud and the parts carried thereby in any predetermined position of adjustment, there is provided on the lower end of the screw or stem 16 a nut 17 having a handle 18 extending radially through the slot 15. When it is desired to adjust this stem 16, the nut is turned by means of the handle so that the handle does not engage either the upper or lower surfaces of the slot. After the stem or screw 16 has been adjusted, it may be locked in position by turning the handle 18 and bringing it into frictional engagement with the upper or lower surface of the slot.

Mounted upon the upper end of the stem, in the manner hereinafter described more in detail, is the work holding device per se which corresponds in structure and arrangement to the work holding device shown in my said application. This device includes a swivel member or support 20 which is in the form of a circular plate having a through central opening constituting a bearing. Carried by this support for rotary adjustment about its own axis is a work holder having a disk 21 and a central hub or sleeve 22, the latter being journalled in the central bearing of the support 20. The work holder is held against endwise movement relative to the member 20 by means of nuts 24 and 25 in the same manner as is disclosed in my said application. The forward end of the central opening in the disk 21 is threaded, as at 26, so that the nipple of the valve body or other piece of work may be secured therein. The disk 21 has two series of openings 28 and 29 which are adapted to receive the screws by means of which the work is adapted to be secured to the disk—all as disclosed in my said application. The disk is further provided with a handle 29' by means of which the disk may be adjusted or turned about its axis. For the purpose of securing the disk 21 in any one of a number of predetermined angular positions, there is provided, adjacent the outer periphery of the disk, a plurality of openings 30 with which is adapted to cooperate a locking plunger or key 31 carried by the support 20 and having a handle 32. The parts so far described are generally similar to those illustrated in my said application.

In accordance with the present invention, I provide means whereby the work holder may be brought to a horizontal position, as shown in Fig. 3. To this end, there is interposed, between the stem 16 and the support 20, pivot means, and means are provided for holding the work holder in horizontal position. Provided upon the upper end of the screw 16 is a ball 40 with which cooperates a socket member 41 which carries the support 20. Extending through the socket member and into the ball are aligned pivot pins 42 about which the support 20 is adapted to swing in a vertical plane through an angle of 90°, that is, from the vertical position shown in Fig. 1 to the horizontal position shown in Fig. 3. For the purpose of locking the ball and socket together in such position that the work holder is vertically disposed, as shown in Fig. 1, there is provided in the ball a spring pressed plunger 43, the upper end of which is adapted to take into a notch 44 in the socket. Behind the plunger is a spring 45 which normally urges the plunger into locking position. Extending from the plunger is a handle 46. When it is desired to disengage the plunger from the socket member, the handle is depressed, and then the socket member may be swung from the position shown in Fig. 1 to that shown in Fig. 3. When the socket member is swung back to the position shown in Fig. 1, the plunger automatically engages in the notch 44, and thus holds the work holder in vertical position.

For the purpose of holding the work holder in a horizontal plane and in any one of a number of predetermined positions about the axes of the screw 16, there are provided, in the periphery of the boss 14, spaced apart vertically extending grooves 50, and provided on the socket member or the stem extending upwardly therefrom is a radially extending arm 51 adapted to selectively engage in the grooves 50. The distance between the bottoms of the grooves 50 and the axis of the stem 16 is equal to the distance between the pivot pins 42 and the under side of the arm 51 so that, when the parts are in the position shown in Fig. 3, this arm is parallel to and engages against the bottom face of the groove in which it is engaged. The width of the arm is substantially the same as the width of the grooves so that the arm has no play in the grooves, and this steadies the work holder when it is in a horizontal plane. It will be observed that, irrespective of the vertical position of adjustment of the stem 16, the arm 51, when the work holder is in horizontal position, is parallel to the axis of the stem 16 and to the bottoms of the grooves 50.

When it is desired to hand lap or polish the wall of a cylinder or chamber in a piece of work by means of a tool adapted to be rotated therein, the work holder, by preference, is brought to the horizontal position shown in Fig. 3. In this position of the parts, there is no tendency for the tool to bear against one side of the chamber more than against the other side, as would be the case if the tool were horizontally disposed. Also, when the work is operated upon, with the work holder horizontally positioned, the operator may more readily and conveniently operate the tool and see what is going on.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a work holding device of the character described, a vertical hub having a plurality of vertically extending grooves spaced about its periphery, a stem threaded into said hub for angular adjustment about a vertical axis, a support, a pivotal connection between said stem and support whereby the latter may be moved to vertical and horizontal positions, a work holder carried by said support for angular adjustment about its own axis, and an arm extending from said support and adapted to selectively engage in said grooves.

2. In a work holding device of the character described, a vertical hub, a stem mounted therein for angular adjustment about a vertical axis, a support, a pivotal connection between said stem and support whereby the latter may be moved to vertical and horizontal positions, a work holder carried by said support for angular adjustment, means carried by said support and adapted to engage said hub to hold said support in horizontal position, and means for locking said support in vertical position comprising a spring pressed plunger carried by said stem and a notch in said support in which said plunger is adapted to engage.

3. In a work holding device of the character described, a hub having a plurality of grooves spaced about its periphery, a work holder, a pivotal connection between said hub and work holder whereby the latter may be moved to vertical and horizontal positions, and means extending from said support and adapted to selectively engage in said grooves in the hub.

4. In a work holding device of the character described, a hub, a stem mounted in said hub for angular adjustment about a vertical axis, a support carried by said stem, a pivotal connection between said stem and support whereby the latter may be swung from a vertical to a horizontal position, a work holder carried by said support for angular adjustment about a horizontal axis when said support is in vertical position and about a vertical axis when said support is in horizontal position, means carried by said stem and cooperating with said support for locking said support and holder in vertical position with respect to said stem, and interengaging means on said support and hub adapted, when said support is in horizontal position, to co-act to hold said support in said position and against rotary movement in a horizontal plane, said interengaging means being arranged to hold said support selectively in any one of a plurality of angular positions with respect to the hub.

GEORGE W. ANDREWS, Jr.